(12) United States Patent
Taylor-Smith et al.

(10) Patent No.: US 6,709,509 B2
(45) Date of Patent: Mar. 23, 2004

(54) PORTLAND CEMENT MANUFACTURE FROM SLAG FROM THE PRODUCTION OF MAGNESIUM METAL

(76) Inventors: Ernest John Taylor-Smith, deceased, late of Vancouver (CA); by Graham J. Phillips, executor, 5705 Owl Court, North Vancouver, B.C. (CA), V7R 4V1

(*) Notice: Subject to any disclaimer, the term of this patent is extended or adjusted under 35 U.S.C. 154(b) by 141 days.

(21) Appl. No.: 09/875,359

(22) Filed: Jun. 5, 2001

(65) Prior Publication Data

US 2003/0000427 A1 Jan. 2, 2003

(51) Int. Cl.⁷ ............................................. C04B 07/36
(52) U.S. Cl. ...................... 106/745; 106/767; 106/789
(58) Field of Search ............................. 106/714, 739, 106/745, 767, 789

(56) References Cited

U.S. PATENT DOCUMENTS

| 4,224,077 A | 9/1980 | Olifer et al. ............... 106/100 |
| 5,421,880 A | 6/1995 | Young ....................... 106/756 |
| 5,494,515 A | 2/1996 | Young ....................... 106/756 |

FOREIGN PATENT DOCUMENTS

| CN | 00101520 | 7/2000 |
| CN | 1260330 | * 7/2000 |
| FR | 2405223 | 5/1979 |
| JP | 002249231 | 12/1977 |
| JP | 01126246 | 5/1989 |
| JP | 002249233 | 5/1989 |
| JP | 04083744 | 3/1992 |
| JP | 52155623 A | 12/1997 |
| SU | 718395 | 3/1980 |
| SU | 002249232 | 3/1980 |

OTHER PUBLICATIONS

U.S. publication 2003/000427, Smith, et al., filed Jan. 2003, 106/739.

* cited by examiner

*Primary Examiner*—Paul Marcantoni
(74) *Attorney, Agent, or Firm*—Graybeal Jackson Haley LLP

(57) ABSTRACT

A process for the production of Portland cement and white Portland cement using magnesium furnace slag, a waste product from the manufacture of magnesium metal, as a primary starting material. The furnace slag is blended with calcium oxide and silicon dioxide to form a feedstock which is heated to a temperature and for an amount of time sufficient to form clinker. The clinker is cooled, ground to a powder, and blended the clinker with powdered gypsum to form the Portland cement. White Portland cement may be produced by removing iron containing compounds from the slag, minimizing contamination of the material by iron compounds throughout the process, and cooling the clinker in a manner that minimizes oxidation of any remaining iron compounds in the clinker.

30 Claims, No Drawings

PORTLAND CEMENT MANUFACTURE FROM SLAG FROM THE PRODUCTION OF MAGNESIUM METAL

BACKGROUND OF THE INVENTION

1. Field of the Invention

The present invention relates to a manufacturing process for producing Portland cement and white Portland cement.

2. Description of the Prior Art

The importance of cement in a modern economy cannot be overemphasized. Cements may be defined as adhesive substances capable of uniting fragments or masses of solid matter to a compact whole, and more specifically, the plastic materials employed to produce adhesion between construction materials. Cements include gypsum plaster, common lime, hydraulic lime, and natural and synthetic Portland cements. Of these, Portland cement is the most important as it is the basic ingredient of modern concrete.

Portland cement is a finely ground powder, usually gray in color, which when mixed with water, binds together other materials (such as sand, gravel, crushed stone) to form concrete, which is the most widely used construction material. Almost all of the cement used in construction today is "Portland" or manufactured hydraulic cement as opposed to "natural" cement widely used a century ago.

The important cementations compounds in Portland cement have been identified as tricalcium silicate and beta dicalcium silicate. Dicalcium silicate has several crystalline phases, each having different properties. The beta and gamma phases are those of interest in the production of cement. The beta phase of dicalcium silicate is hydraulic and thus a cementations compound, but the gamma phase is not since it does not react to any appreciable extent with water. Tricalcium silicate contributes to the high early strength of cement because it hydrates more rapidly than dicalcium silicate, but both compounds ultimately set to the same strength. Other compounds sometimes present in Portland cement are tricalcium aluminate, 12-calcium-7-aluminate and tetracalcium aluminoferrate.

Processes for the manufacture of Portland cement are known in the art and have been described in detail, for example in the book "The Cement Plant Operations Handbook" by Philip A. Alsop and James W. Post, Tradeship Publications Ltd., 1$^{st}$ ed., 1995. Generally, the conventional methods of making Portland cement use as raw materials calcium carbonate (usually in the form of limestone), silica (usually sand or quartzite), alumina (usually in the form of clay or shale) and ferric oxide (often in the form of iron ore). These materials are quarried or mined, crushed, pre-homogenized and then ground. The ground raw materials are blended and fired in a rotary kiln. The first chemical reaction that occurs is the calcination of the calcium carbonate to produce calcium oxide and carbon dioxide. Sometimes calcining is carried out in a reaction chamber, known as a precalciner, prior to the raw feed entering the kiln. The temperature in the kiln is controlled in the range of 1200° C.–1500° C., depending on the raw materials that are used. At these temperatures, ferric oxide and alumina melt so the feed has about a 20–30% liquid content. Raw feed mixtures with a high ratio of ferric oxide:alumina require only kiln temperatures on the low end of the temperature range, while those with a low ratio of ferric oxide:alumina require temperatures on the high end. In the kiln, calcium oxide combines with silica to form dicalcium silicate and tricalcium silicate. The presence of liquid promotes the mixing of the feed materials and allows the formation of dicalcium silicate and tricalcium silicate at a reasonable rate. The ferric oxide and alumina combine with the calcium oxide to form tetracalcium aluminoferrate, calcium aluminate and/or 12 calcium 7 aluminate, depending on the exact composition of the new material. Because liquid is formed during the reactions in the kiln, the resulting material is in the form of pellets known as clinker. On leaving the kiln the clinker is cooled, usually by forced air convection in a clinker cooler. The clinker is then blended with a small proportion of gypsum, or other regulative additive, and ground to produce finished Portland cement.

White Portland cement is produced by the same general processes as are used to produce grey Portland cement, except that iron containing compounds are removed from the feedstock, and contact of the feedstock or clinker with iron containing components of the cement plant equipment is minimized. Additionally, the clinker exiting the kiln is cooled more quickly to reduce the oxidation of any remaining iron in the clinker.

The above generally describes known processes for the production of Portland cement, which, together with other processes, are well known to persons skilled in the art of Portland cement production. What is not known in the art is the production of Portland cement from waste furnace slag by-product from the production of magnesium metal.

Magnesium furnace slag is a residue from the manufacture of magnesium metal. Magnesium furnace slag has previously been considered a worthless product and has been dumped in large landfills and allowed to accumulate. Recently, the build up of waste magnesium furnace slag has become a problem and could threaten the long term viability of some magnesium plants. As a result, there is a need to reduce the amount of magnesium furnace slag being dumped into the environment and to have commercial uses for such slag.

SUMMARY OF THE INVENTION

An aspect of the present invention is a process for producing white Portland cement from magnesium furnace slag by the steps of removing iron containing compounds from magnesium furnace slag, blending the magnesium furnace slag with calcium oxide (CaO) or a compound able to produce calcium oxide upon heating, and with silicon dioxide ($SiO_2$) to form a feedstock, heating the feedstock to a temperature and for an amount of time sufficient to form clinker, cooling the clinker in a way that minimizes the oxidation of iron containing compounds in the clinker, reducing the particle size of the clinker to that of a powder, blending the clinker with a powdered regulating additive to form white Portland cement, and minimizing contamination of the slag, feedstock and clinker by iron containing compounds during the steps in the process.

Another aspect of the present invention is a process for producing Portland cement from magnesium furnace slag by the steps of blending magnesium furnace slag with calcium oxide (CaO) or a compound able to produce calcium oxide upon heating, and with silicon dioxide ($SiO_2$) to form a feedstock, heating the feedstock to a temperature and for an amount of time sufficient to form clinker, cooling the clinker, reducing the particle size of the clinker to that of a powder, and blending the clinker with a powdered regulating additive to form the Portland cement.

DETAILED DESCRIPTION OF THE INVENTION

The invention provides a process for the production of Portland cement and white Portland cement using magnesium furnace slag as a primary starting material.

Magnesium furnace slag is a residue from the manufacture of magnesium metal. By way of example, one source of magnesium furnace slag is the Northwest Alloys, Inc. magnesium production facility at Addy, in State of Washington. Other sources of magnesium furnace slag could be other magnesium metal manufacturing facilities throughout the world, such as, for example, facilities operated by Pechiney in France, and Mintek in South Africa.

Magnesium furnace slag that is produced from the production of magnesium metal is typically composed of the following minerals in the approximate percentage composition ranges as follows:

|  | % Composition |
| --- | --- |
| $Ca_2SiO_4$ | approx. 55% to approx. 65% |
| $(CaO)_{12}(Al_2O_3)_7$ | approx. 20% to approx. 30% |
| $Fe_2O_3$ | 0% to approx. 5% |
| MgO | 0% to approx. 5% |
| CaO | 0% to approx. 5% |

Samples of the slag from the magnesium facility at Addy have been tested after iron was removed therefrom and found to have a fairly consistent composition as follows:

|  | a. % Composition |
| --- | --- |
| $Ca_2SiO_4$ | 65% |
| $(CaO)_{12}(Al_2O_3)7$ | 28% |
| MgO | 4% |
| CaO | 2% |
| Other | 1% |

The percentages above are given by weight for compounds that are generally present in a proportion of greater than 1%, and there may be some other compounds in trace amounts.

In the process of magnesium metal production, the resultant magnesium furnace slag may be allowed to cool slowly upon exiting the furnace, in which case the slag decrepitates, or breaks apart, into a powder. If the slag, upon exiting the furnace, is cooled quickly ("quick-chilled") by contact with a heat sink (such a water or a cold concrete floor) it does not decrepitate and ends up as "sand-like" particles.

For the purposes of this specification, reference is made to two kinds of magnesium furnace slag. The first kind is the slag that is freshly produced in the magnesium metal production process and is unhydrated, and is referred to herein as "fresh slag" or "unhydrated slag". The second kind is the slag that has been stored in dumps or landfills, exposed to the elements, and is therefore hydrated due to exposure to air and water. The second kind of slag is referred to herein as "dump slag" or "hydrated slag".

Hydrated or dump slag is the preferred kind of magnesium furnace slag to use in the processes of the present invention, although fresh or unhydrated slag may also be used.

In preferred embodiments of the process of the present invention for producing white Portland cement, hydrated slag is dried and iron containing compounds are removed from the slag. Elemental iron or ferromagnetic material present in the slag may be removed by magnetic separation, such as passing the slag close to a magnet, preferably a rotary magnet, prior to blending the slag into the feedstock. This is because the greyness in Portland cement is primarily caused by the presence of tetracalcium aluminoferrate, which results from iron containing compounds present in the feedstock. The magnesium furnace slag is then ground to an average particle mesh size approximately in the range of about 250 mesh to 325 mesh. The slag is then blended with calcium oxide (CaO) and silicon dioxide ($SiO_2$), each of which have also been ground into a powder of a similar range in particle size, to form a feedstock which is fed into a rotary kiln to be sintered. It is preferable that the feedstock be of particle size of approximately 250 mesh or smaller. For white Portland cement, the mechanical handling of the starting material, the feedstock and the cement clinker are carried out in such manner so as to minimize contamination with iron compounds which may result from direct contact of the materials with the iron containing components of the processing equipment such as the grinders and kilns. The grinding of the starting material, the feedstock or the clinker are carried out in such a way so that contact of the material to be ground with the iron components of the machinery is minimized. For example, grinding of the material may be carried out in a ballmill lined with ceramics and using ceramic balls. The kiln used to sinter the feedstock should be ceramic-lined to minimize direct contact with iron containing components. The use of a clean burning fuel, such as natural gas, in the kiln is preferable so as to minimize contamination of the clinker.

In these embodiments, the starting materials (i.e. the slag, CaO and $SiO_2$) are first ground and then blended, but it will be apparent to those skilled in the art that it is also possible to first blend the starting materials and then grind them to the desired particle size to form the feedstock. The starting materials may be in the following ranges of proportions by weight to produce a feedstock:

Slag from a minimum of about: 30%, 35%, 40%, 45%, 50%, 55%, 60% 65%, or 70% to a maximum of about 45%, 50%, 55%, 60%, 65%, 75%, 80%, 85%, 90%, 92%, 94%, 98%, or 99%, wherein a range may, for example, be selected from any of the foregoing minimum values in combination with any of the foregoing maximum values, or any value lesser than, greater than or in between, for example, 35% to 98%, or 45% to 55%, or about 50%.

CaO from a minimum of 0.1%, 0.3%, 0.7%, 1%, 3% 5%, 10%, 15%, 20%, 25%, 30%, 35%, 40%, or 45%, to a maximum of 30%, 35%, 45%, 50%, or 55%, wherein a range may, for example, be selected from any of the foregoing minimum values in combination with any of the foregoing maximum values, or any value lesser than, greater than or in between, for example, 1% to 47%, or 35% to 43%, or about 39%.

$SiO_2$ from a minimum of 0.1%, 0.3%, 0.7%, 1%, 3%, 5%, 10%, or 15%, 20% to a maximum of 5%, 10%, 15%, 20%, or 25%, wherein a range may, for example, be selected from any of the foregoing minimum values in combination with any of the foregoing maximum values, or any value lesser than, greater than or in between, for example, 1% to 20%, or 9% to 13%, or about 11%.

The feedstock in the kiln is converted to cement clinker by heating the feedstock until it partially melts to form clinker. Typically, the temperature in the kiln will be in the range of 1200° C.–1500° C. Because the slag has previously been subjected to melting in the magnesium production process, the time required for the feedstock to sinter in the hot zone of the kiln is generally less than the time required to sinter conventional raw materials used in the Portland cement production. It has been found that the feedstock of the present invention sinters in the hot zone of the kiln to form clinker in about fifteen minutes, whereas conventional materials sinter in about sixty minutes. As a result, a shorter kiln may be used in the process of the present invention, which could translate to reduced capital or energy costs.

As in the prior art processes, the product of the kiln is in the form of pellets, or clinker, because of liquid formation during the process. After passing through the kiln, the clinker exits the discharge end of the kiln into a cooler. As the clinker exits the kiln, it is protected against the oxidation of any remaining iron content therein during cooling until the clinker reaches a temperature of approximately 700° C., and preferably lower, by water or oil sprays at the discharge end of the kiln to cool the clinker and prevent oxidation after the burning zone, and by water quenching in drag conveyors after the clinker is discharged from the kiln. Decolorizing cooling substances such as $CO_2$ or $CO$ gas may also be used as a cooling medium.

The clinker resulting from the above described process to produce white Portland cement are a vivid green colour, but will turn to an ivory white colour when the clinker is finely ground. The clinker may be stored for long periods of time until needed. In order to make the final cement product, the clinker is ground in a manner to minimize contamination with iron, to an average particle size preferably in the range of 250 to 325 mesh. The clinker is then blended with powdered gypsum ($CaSO_4$) which acts as a regulative additive. The resulting blend is white Portland cement powder. The amount of gypsum may be in the range of 5% to 9% by weight of the Portland cement. It will also be apparent to persons skilled in the art that the clinker and gypsum may be first blended and then ground to the desired particle size.

It will be understood that either the decrepitated slag or the quick-chilled slag may be used in the processes of the present invention. If the decrepitated slag is used, then there would be the added advantage that the slag would not have to be ground to any great extent since it is already within the preferable particle size range, except to break up any clumps that may have formed during storage.

Although feedstocks composed out of the above ranges of the starting materials will produce Portland cements, when made in accordance with the process of the present invention, the resulting Portland cements may have a range of setting times depending on the composition the feedstock.

In some embodiments, if a cement is desired that conforms to the setting time requirements in the ASTM C150 Specification for Portland Cement, then magnesium furnace slag having a composition closely similar to the composition of the magnesium furnace slag produced at the facility at Addy, as described above in this document, should be used and the following proportions of the starting materials by weight of the feedstock should be used:

| | |
|---|---|
| Slag | 50% |
| CaO | 39% |
| $SiO_2$ | 11% |

The resulting clinker is then ground to a desired mesh size and blended with powdered gypsum ($CaSO_4$) of a similar mesh size to form Portland cement powder. The amount of gypsum in the blend is 7% by weight of the Portland cement.

By varying the proportions of CaO and/or $SiO_2$ added to the slag, one can vary the concentration of the alumina ($Al_2O_3$) in the end cement product, which will affect the setting times of the cement. The higher the proportion of CaO and/or $SiO_2$ to the slag in the feedstock, the lower the concentration of alumina ($Al_2O_3$) will be in the final cement product. Generally, higher concentrations of alumina ($Al_2O_3$) in the end cement product result in faster setting times. As an illustrative example, a feedstock composed of 60% slag, 33% CaO, and 7% $SiO_2$ yielded a concentration of alumina in the cement of 8.7%, and the cement set too quickly to meet the ASTM C150 specification. Gypsum ($CaSO_4$) in the final cement product tends to retard the setting times.

Although it is preferable to use calcium oxide as a starting material, a source of calcium oxide that yields calcium oxide upon heating may be used other than calcium oxide itself. In such case, the percentages given are in terms of the equivalent weight of calcium oxide that would be produced upon heating. A preferred source that yields calcium oxide upon heating is Limestone (calcium carbonate). As an illustrative example, a mix of 35.7 lb. calcium carbonate with 80 lb. of slag would result in a composition of 20% calcium oxide, 80% slag.

The present invention also provides for the production of standard grey Portland cement by the processes described above, but omitting the removal of iron compounds from the slag. As well, the equipment used for grey Portland cement need not be lined with ceramics, and the cooling of the clinker as it leaves the kiln may be carried out by conventional cooling methods such as with air blown over or through the clinker.

The manufacture of Portland cement and white Portland cement according to the present invention has a number of important advantages over the prior art. There is a considerable savings in capital costs because an available waste product which needs little or no size reduction is used as a primary starting material. Because no calcining of the feedstock is required there is a significant saving in energy cost, as well as savings in capital costs. And because of the shorter time required in the kiln for the feedstock to form clinker, a shorter kiln may be used than in the conventional processes of the prior art. This translates to less energy consumption, resulting in savings to the capital costs of the kiln and to the costs of maintenance. In the case of white Portland cement, the invention provides a process for manufacturing a high value cement for which suitable raw materials are relatively uncommon. Another advantage of the present invention is that it exploits waste material, previously used for landfill, to produce a valuable material of commercial significance.

What is claimed is:

1. A process for producing Portland cement, comprising the steps of:
   a) blending magnesium furnace slag with calcium oxide (CaO) or a compound able to produce calcium oxide upon heating, and with silicon dioxide ($SiO_2$) to form a feedstock;
   b) heating the feedstock to a temperature and for an amount of time sufficient to form clinker;
   c) cooling the clinker;
   d) reducing the particle size of the clinker to that of a powder; and
   e) blending the clinker with a powdered regulating additive to form the Portland cement.

2. The process of claim 1 wherein the magnesium furnace slag is hydrated slag.

3. The process of claim 2, wherein the magnesium furnace slag, the calcium oxide or the compound able to produce calcium oxide upon heating, and the silicon dioxide are in a reduced particulate or powdered form.

4. The process of claim 3 wherein the regulating additive is gypsum.

5. The process of claim 4 wherein the amounts of magnesium furnace slag, silicon dioxide and calcium oxide in the feedstock are within the following range of proportions by weight of the feedstock:
   i) about 35%–98% magnesium furnace slag;
   ii) about 1%–47% calcium oxide; and
   iii) about 1%–20% silicon dioxide.

6. The process of claim 4 wherein the composition of the magnesium furnace slag, after the removal of iron compounds, closely resembles the following proportions, expressed by weight of the magnesium furnace slag: about 65% $Ca_2SiO_4$; about 28% $(CaO)_{12}(Al_2O_3)_7$; about 4% MgO; about 2% CaO; and about 1% other compounds.

7. The process of claim 6 wherein:
   a) the amounts of magnesium furnace slag, silicon dioxide and calcium oxide in the feedstock are within the following range of proportions by weight of the feedstock:
      i) about 45%–55% magnesium furnace slag;
      ii) about 35%–43% calcium oxide;
      iii) about 9%–13% silicon dioxide; and
   b) the amount of gypsum blended with the clinker is in the range of about 5%–9% by weight of the Portland cement.

8. The process of claim 6 wherein:
   a) the amounts of magnesium furnace slag, silicon dioxide and calcium oxide in the feedstock are near the following proportions by weight of the feedstock:
      i) about 50% magnesium furnace slag;
      ii) about 39% calcium oxide;
      iii) about 11% silicon dioxide; and
   b) the amount of gypsum in the composition is about 7% by weight of the Portland cement.

9. A process for producing clinker for use in the production of Portland cement, comprising the steps of:
   a) blending magnesium furnace slag with calcium oxide (CaO), or a compound able to produce calcium oxide upon heating, and with silicon dioxide ($SiO_2$) to form a feedstock;
   b) heating the feedstock to a temperature and for an amount of time sufficient to form clinker; and
   c) cooling the clinker.

10. The process of claim 9 wherein the magnesium furnace slag is hydrated slag.

11. The process of claim 10, wherein the magnesium furnace slag, the calcium oxide or the compound able to produce calcium oxide upon heating, and the silicon dioxide are in a reduced particulate or powdered form.

12. The process of claim 11 wherein the amounts of magnesium furnace slag, silicon dioxide and calcium oxide in the feedstock are within the following range of proportions by weight of the feedstock:
   i) about 35%–98% magnesium furnace slag;
   ii) about 1%–47% calcium oxide; and
   iii) about 1%–20% silicon dioxide.

13. The process of claim 11 wherein the composition of the magnesium furnace slag, after the removal of iron compounds, closely resembles the following proportions, expressed by weight of the magnesium furnace slag: about 65% $Ca_2SiO_4$; about 28% $(CaO)_{12}(Al_2O_3)_7$; about 4% MgO; about 2% CaO; and about 1% other compounds.

14. The process of claim 13 wherein:
   a) the amounts of magnesium furnace slag, silicon dioxide and calcium oxide in the feedstock are within the following range of proportions by weight of the feedstock:
      i) about 45%–55% magnesium furnace slag;
      ii) about 35%–43% calcium oxide; and
      iii) about 9%–13% silicon dioxide.

15. The process of claim 13 wherein:
   a) the amounts of magnesium furnace slag, silicon dioxide and calcium oxide in the feedstock are near the following proportions by weight of the feedstock:
      i) about 50% magnesium furnace slag;
      ii) about 39% calcium oxide; and
      iii) about 11% silicon dioxide.

16. A process for producing white Portland cement, comprising the steps of:
   a) removing iron containing compounds from magnesium furnace slag;
   b) blending magnesium furnace slag with calcium oxide (CaO) or a compound able to produce calcium oxide upon heating, and with silicon dioxide ($SiO_2$) to form a feedstock;
   c) heating the feedstock to a temperature and for an amount of time sufficient to form clinker;
   d) cooling the clinker to minimizes the oxidation of iron containing compounds in the clinker;
   e) reducing the particle size of the clinker to that of a powder;
   f) blending the clinker with a powdered regulating additive to form white Portland cement; and
   g) minimizing contamination of the magnesium furnace slag, feedstock and clinker by iron containing compounds during the steps in the process.

17. The process of claim 16 wherein the magnesium furnace slag is hydrated slag.

18. The process of claim 17, wherein the magnesium furnace slag, the calcium oxide or the compound able to produce calcium oxide upon heating, and the silicon dioxide are in a reduced particulate or powdered form.

19. The process of claim 18 wherein the regulative additive is gypsum.

20. The process of claim 19 wherein the amounts of magnesium furnace slag, silicon dioxide and calcium oxide in the feedstock are within the following range of proportions by weight of the feedstock:
   i) about 35%–98% magnesium furnace slag;
   ii) about 1%–47% calcium oxide; and
   iii) about 1%–20% silicon dioxide.

21. The process of claim 18 wherein the composition of the magnesium furnace slag, after the removal of iron compounds, closely resembles the following proportions, expressed by weight of the magnesium furnace slag: about 65% $Ca_2SiO_4$; about 28% $(CaO)_{12}(Al_2O_3)_7$; about 4% MgO; about 2% CaO; and about 1% other compounds.

22. The process of claim 21 wherein:
   a) the amounts of magnesium furnace slag, silicon dioxide and calcium oxide in the feedstock are within the following range of proportions by weight of the feedstock:
      i) about 45%–55% magnesium furnace slag;
      ii) about 35%–43% calcium oxide;
      iii) about 9%–13% silicon dioxide; and
   b) the amount of gypsum blended with the clinker is in the range of about 5%–9% by weight of the white Portland cement.

23. The process of claim 21 wherein:
a) the amounts of magnesium furnace slag, silicon dioxide and calcium oxide in the feedstock are near the following proportions by weight of the feedstock:
   i) 50% magnesium furnace slag;
   ii) 39% calcium oxide;
   iii) 11% silicon dioxide; and
b) the amount of gypsum in the composition is about 7% by weight of the white Portland cement.

24. A process for producing clinker for use in the production of white Portland cement, comprising the steps of:
a) removing iron containing compounds from magnesium furnace slag;
b) blending magnesium furnace slag with calcium oxide (CaO) or a compound able to produce calcium oxide upon heating, and with silicon dioxide ($SiO_2$) to form a feedstock;
c) heating the feedstock to a temperature and for an amount of time sufficient to form clinker;
d) cooling the clinker to minimizes the oxidation of iron containing compounds in the clinker; and
e) minimizing contamination of the magnesium furnace slag, feedstock and clinker by iron containing compounds during the steps in the process.

25. The process of claim 24 wherein the magnesium furnace slag is hydrated slag.

26. The process of claim 25, wherein the magnesium furnace slag, the calcium oxide or the compound able to produce calcium oxide upon heating, and the silicon dioxide are in a reduced particulate or powdered form.

27. The process of claim 26 wherein the amounts of magnesium furnace slag, silicon dioxide and calcium oxide in the feedstock are within the following range of proportions by weight of the feedstock:
   i) about 35%–98% magnesium furnace slag;
   ii) about 1%–47% calcium oxide; and
   iii) about 1%–20% silicon dioxide.

28. The process of claim 26 wherein the composition of the magnesium furnace slag, after the removal of the iron compounds, closely resembles the following proportions, expressed by weight of the magnesium furnace slag: about 65% $Ca_2SiO_4$; about 28% $(CaO)_{12}(Al_2O_3)_7$; about 4% MgO; about 2% CaO; and about 1% other compounds.

29. The process of claim 28 wherein:
a) the amounts of magnesium furnace slag, silicon dioxide and calcium oxide in the feedstock are within the following range of proportions by weight of the feedstock:
   i) about 45%–55% magnesium furnace slag;
   ii) about 35%–43% calcium oxide; and
   iii) about 9%–13% silicon dioxide.

30. The process of claim 28 wherein:
a) the amounts of magnesium furnace slag, silicon dioxide and calcium oxide in the feedstock are near the following proportions by weight of the feedstock:
   i) about 50% magnesium furnace slag;
   ii) about 39% calcium oxide; and
   iii) about 11% silicon dioxide.

* * * * *